(12) United States Patent
Torii

(10) Patent No.: US 10,430,670 B2
(45) Date of Patent: Oct. 1, 2019

(54) IMAGE-RECOGNITION DEVICE AND METHOD FOR CONTROLLING SAME

(71) Applicant: Robert Bosch GmbH, Stuttgart (DE)

(72) Inventor: Takehito Torii, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 15/309,714

(22) PCT Filed: Apr. 17, 2015

(86) PCT No.: PCT/JP2015/061810
§ 371 (c)(1),
(2) Date: Nov. 8, 2016

(87) PCT Pub. No.: WO2015/174208
PCT Pub. Date: Nov. 19, 2015

(65) Prior Publication Data
US 2017/0154224 A1   Jun. 1, 2017

(30) Foreign Application Priority Data

May 12, 2014 (JP) .................................. 2014-098259

(51) Int. Cl.
*G06K 9/00* (2006.01)
*G06K 9/32* (2006.01)
(Continued)

(52) U.S. Cl.
CPC ............ *G06K 9/00791* (2013.01); *B60R 1/00* (2013.01); *G06K 9/3208* (2013.01); *G06T 3/60* (2013.01);
(Continued)

(58) Field of Classification Search
None
See application file for complete search history.

(56) References Cited

U.S. PATENT DOCUMENTS

2003/0160760 A1* 8/2003 Takakura ............. H04N 1/3876
345/158
2012/0099763 A1 4/2012 Katoh et al.
2013/0088343 A1* 4/2013 Deigmoller ............. G06T 7/215
340/436

FOREIGN PATENT DOCUMENTS

CN          101091103 A      12/2007
JP          2003259110        9/2003
(Continued)

OTHER PUBLICATIONS

International Search Report for Application No. PCT/JP2015/061810 dated Jul. 14, 2015 (English Translation, 1 page).

*Primary Examiner* — Dakshesh D Parikh
(74) *Attorney, Agent, or Firm* — Michael Best & Friedrich LLP

(57) ABSTRACT

The invention has a purpose of providing an image-recognition device capable of appropriately performing image recognition even when a vehicle body is tilted, and a method for controlling the same.
An image-recognition device 10 is mounted in the vehicle body and recognizes a surrounding situation of the vehicle body on the basis of image data that corresponds to an image of surroundings captured from the vehicle body. The image-recognition device 10 includes: a tilt-detection section 2 that detects a tilt of the vehicle body; an image-rotation section 4 that rotates the image data for correction in accordance with the tilt detected by the tilt-detection section 2; and an image-recognition section 5 that recognizes the surrounding situation of the vehicle body on the basis of corrected image data that is generated when the image-rotation section 4 rotates the image data for the correction.

6 Claims, 3 Drawing Sheets

(51) Int. Cl.
*B60R 1/00* (2006.01)
*G06T 3/60* (2006.01)
*G08G 1/16* (2006.01)

(52) U.S. Cl.
CPC ..... *B60R 2300/30* (2013.01); *B60R 2300/605* (2013.01); *B60R 2300/804* (2013.01); *B60R 2300/8033* (2013.01); *B60R 2300/8093* (2013.01); *G08G 1/166* (2013.01)

(56) References Cited

FOREIGN PATENT DOCUMENTS

| | | | | |
|---|---|---|---|---|
| JP | 2012093872 | | 5/2012 | |
| JP | 2013084242 | | 5/2013 | |
| JP | 2013-186872 | * | 9/2013 | ............... G08G 1/16 |
| JP | 2013186872 | | 9/2013 | |

* cited by examiner

[Fig. 1]
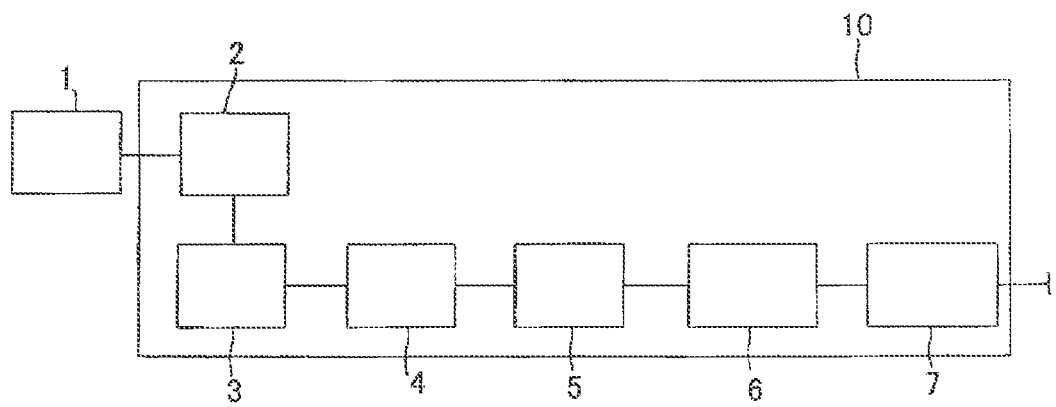
[Fig. 2]
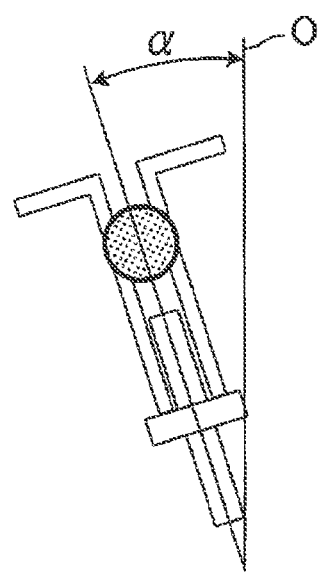

[Fig. 3]
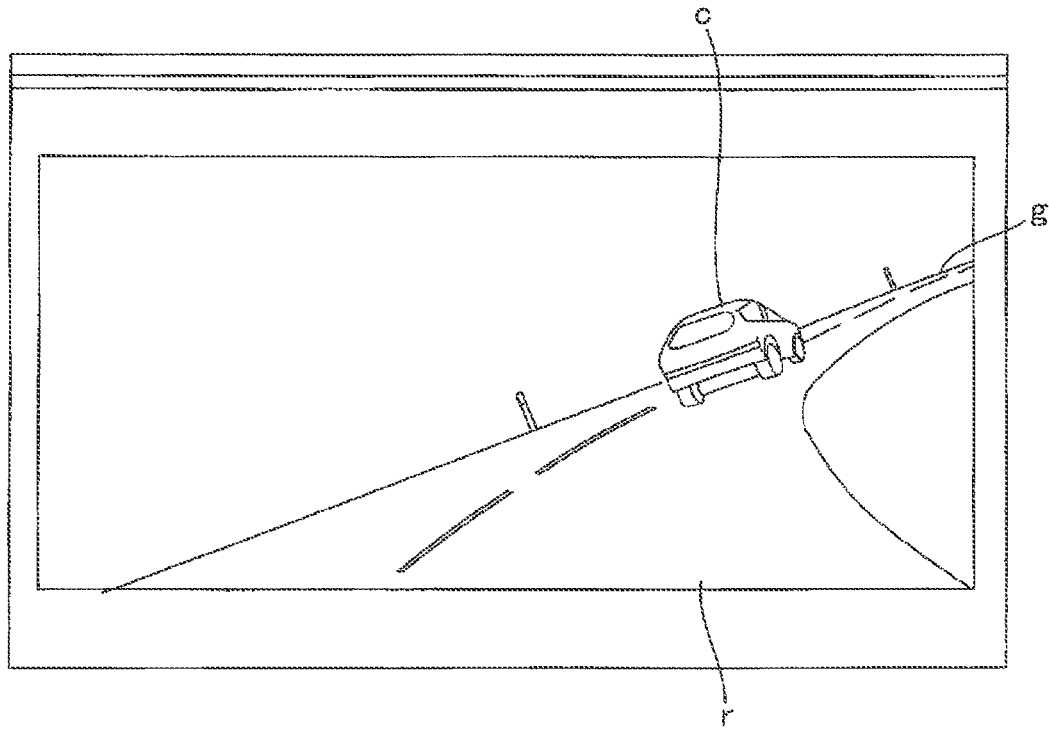
[Fig. 4]
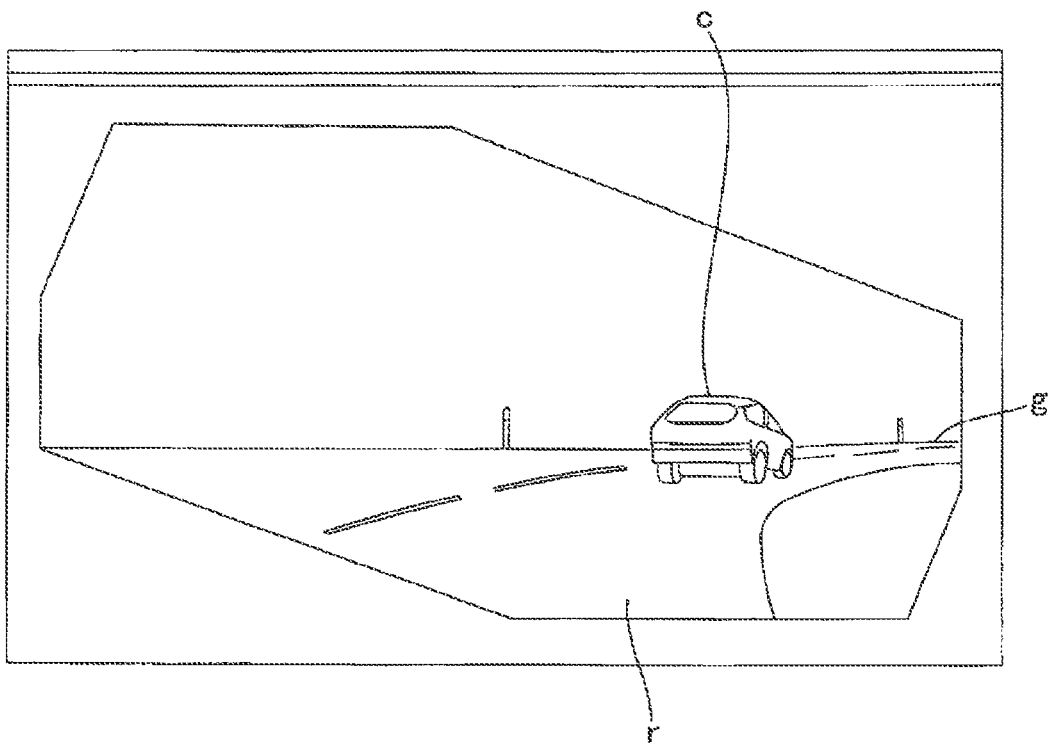

[Fig. 5]
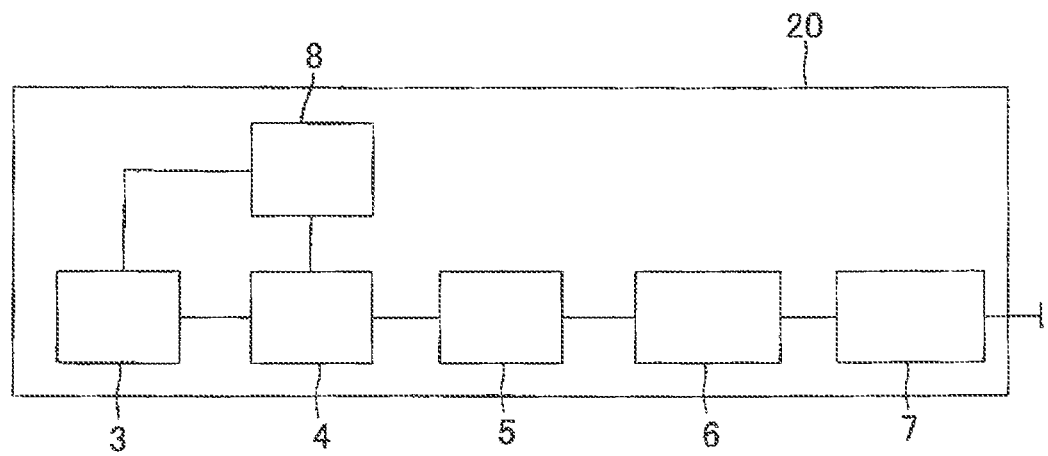
[Fig. 6]
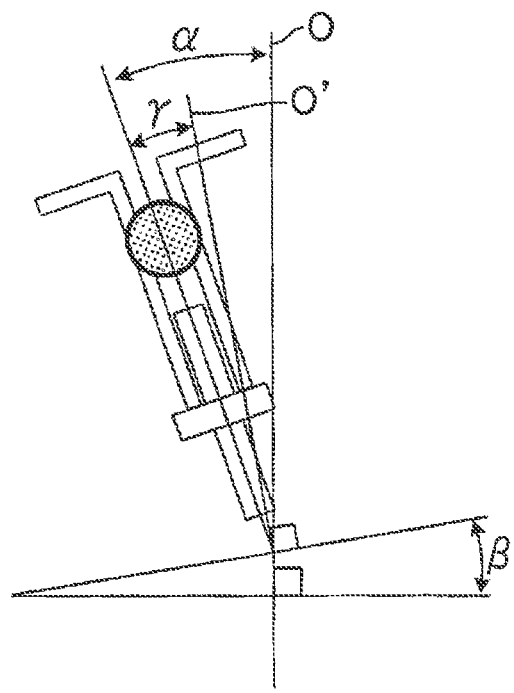

IMAGE-RECOGNITION DEVICE AND METHOD FOR CONTROLLING SAME

BACKGROUND OF THE INVENTION

The invention relates to an image-recognition device that is mounted in a vehicle body and recognizes a surrounding situation of the vehicle body, such as another vehicle, a pedestrian, and road surface marking, on the basis of image data that corresponds to an image of surroundings captured from the vehicle body, and a method for controlling the same.

An image-recognition device that is mounted in a vehicle body and recognizes a surrounding situation of the vehicle body, such as another vehicle, a pedestrian, and road surface marking, on the basis of image data that corresponds to an image of surroundings captured from the vehicle body and a method for controlling the same have conventionally been known. For this type of the image-recognition device, a camera or the like is mounted in the vehicle body, and a region of the image as a recognition target is changed in accordance with a magnitude of displacement of an optical axis of the camera. In this way, recognition performance for the recognition target is improved, and the displacement of the optical axis of the camera is corrected (for example, see JP-A-2012-093872).

SUMMARY OF THE INVENTION

However, in the case where an imaging device such as the camera is mounted in the vehicle body, particularly a motorcycle or the like, with vehicle body behavior that is significantly tilted in a lateral direction, the imaging device is also significantly tilted with the vehicle body. Thus, the image-recognition device according to the above conventional technique had a difficulty in appropriately performing image recognition, such as object recognition for recognizing the other vehicle or the pedestrian and road surface marking recognition for recognizing the road surface marking and the like.

The invention has purposes of solving the problem pertaining to the above-described conventional technique and providing an image-recognition device capable of appropriately performing image recognition even when a vehicle body is tilted and a method for controlling the same.

The invention is an image-recognition device that is mounted in a vehicle body and that recognizes a surrounding situation of the vehicle body on the basis of image data that corresponds to an image of surroundings captured from the vehicle body. The image-recognition device is characterized by including: a tilt-detection section that detects a tilt of the vehicle body; an image-rotation section that rotates the image data for correction in accordance with the tilt detected by the tilt-detection section; and an image-recognition section that recognizes the surrounding situation of the vehicle body on the basis of corrected image data that is generated when the image-rotation section rotates the image data for the correction.

In this case, the image-rotation section may rotate the image data for the correction such that the image is tilted in a direction of the tilt. The image-rotation section may rotate the image data for the correction such that the image is tilted only by an amount of the tilt. The tilt-detection section may detect the tilt of the vehicle body by using a tilt angle sensor. The tilt-detection section may detect the tilt of the vehicle body on the basis of the image data. The tilt-detection section may output tilt information that corresponds to the tilt to the image-rotation section.

In addition, the invention is a method for controlling an image-recognition device that is mounted in a vehicle body and that recognizes a surrounding situation of the vehicle body on the basis of image data that corresponds to an image of surroundings captured from the vehicle body, the image-recognition device including: a tilt-detection section that detects a tilt of the vehicle body; an image-rotation section that rotates the image data for correction in accordance with the tilt detected by the tilt-detection section; and an image-recognition section that recognizes the surrounding situation of the vehicle body on the basis of corrected image data that is generated when the image-rotation section rotates the image data for the correction. The method for controlling the image-recognition device is characterized by including the steps of: detecting the tilt of the vehicle body by the tilt-detection section; rotating the image data for the correction by the image-rotation section in accordance with the tilt detected by the tilt-detection section; and recognizing the surrounding situation of the vehicle body by the image-recognition section on the basis of the corrected image data that is generated when the image-rotation section rotates the image data for the correction.

In this case, the image-rotation section may rotate the image data for the correction such that the image is tilted in a direction of the tilt. The image-rotation section may rotate the image data for the correction such that the image is tilted only by an amount of the tilt. The tilt-detection section may detect the tilt of the vehicle body by using a tilt angle sensor. The tilt-detection section may detect the tilt of the vehicle body on the basis of the image data. The tilt-detection section may output tilt information that corresponds to the tilt to the image-rotation section.

In the invention, image recognition can appropriately be performed even when the vehicle body is tilted.

BRIEF DESCRIPTION OF THE DRAWINGS

FIG. 1 shows a block diagram of an image-recognition device and a tilt angle sensor according to a first embodiment.

FIG. 2 shows a view that schematically depicts a tilted state of a vehicle body from front of the vehicle body.

FIG. 3 shows an image ahead of the vehicle body that is captured from the vehicle body side.

FIG. 4 shows an image that is obtained by rotating the captured image for correction.

FIG. 5 shows a block diagram of an image-recognition device 20 according to a second embodiment.

FIG. 6 shows a view that schematically depicts a tilted state of the vehicle body on a tilted road surface from the front of the vehicle body.

DETAILED DESCRIPTION

A description will hereinafter be made on preferred embodiments of the invention with reference to the drawings.

FIG. 1(a) is a block diagram of an image-recognition device and a tilt angle sensor according to a first embodiment. This image-recognition device 10 is a device that is mounted in a vehicle body of a motorcycle or the like and that recognizes a surrounding situation of the vehicle body through image recognition, such as object recognition for recognizing another vehicle or a pedestrian and road surface marking recognition for recognizing road surface marking and the like, on the basis of image data that corresponds to an image of surroundings captured from the vehicle body.

The image-recognition device 10 is connected to a tilt angle sensor 1 and includes a tilt angle input section (a tilt-detection section) 2, an imaging section 3, an image-rotation section 4, an image-recognition section 5, a drive assist control section 6, and an output section 7.

The tilt angle sensor 1 is a sensor for detecting a tilt angle of the vehicle body. This tilt angle sensor 1 is connected to the tilt angle input section 2 and outputs a tilt angle signal that corresponds to the detected tilt angle to the tilt angle input section 2. In this embodiment, the detected tilt angle is output as the signal to the tilt angle input section 2. However, the detected tilt angle may be output as tilt angle data corresponding to the tilt angle to the tilt angle input section 2.

The tilt angle input section 2 is a detection section of the image-recognition device 10 that detects the tilt angle of the vehicle body on the basis of the tilt angle signal input from the tilt angle sensor 1. This tilt angle input section 2 generates the tilt angle data on the basis of the input tilt angle signal and outputs the generated tilt angle data as tilt information to the imaging section 3.

The imaging section 3 is a camera and captures a view ahead of the vehicle body as a still image or a video. This imaging section 3 generates image data on the basis of the captured image and outputs the image data with the tilt angle data, which is input from the tilt angle input section 2, to the image-rotation section 4.

The image-rotation section 4 is an image processing section for performing rotation correction of the image data such that the image corresponding to the image data is rotated. This image-rotation section 4 rotates the image data, which is received from the imaging section 3, for correction on the basis of the tilt angle data as the tilt information that is detected by the tilt angle input section 2 and is input via the imaging section 3. The image-rotation section 4 outputs corrected image data, which is obtained by rotating the image data for the correction, to the image-recognition section 5.

The image-recognition section 5 recognizes the surrounding situation of the vehicle body on the basis of the input image data. More specifically, the image-recognition section 5 performs: the object recognition for recognizing the other vehicle, the pedestrian, a motorcycle, or a bicycle, which is captured in the image, from the image data; the road surface making recognition for recognizing the road surface marking and the like; road sign recognition for recognizing a road sign and the like; and the like. When performing each type of the recognition, the image-recognition section 5 outputs position information data to the drive assist control section 6, the position information data including position information of each of the recognized objects.

The drive assist control section 6 assists in an operation by a driver and notifies the driver of a warning. Based on the position information data that is input from the image-recognition section 5, this drive assist control section 6 executes vehicle body control and processing related to a collision warning, a lane departure warning, a warning to the driver issued by a drive assist system for the road sign recognition or the like. The vehicle body control includes automatic emergency braking in a case where an obstacle or the like is present ahead of the vehicle, adaptive cruise control (ACC), lane keeping, and the like. The drive assist control section 6 executes the vehicle body control and the processing related to the warnings and outputs control signals that correspond to these types of the processing to the output section 7.

The output section 7 can output a signal from the image-recognition device 10 to a brake unit, an engine electric control unit (ECU), an electric power steering (EPS), and the like of the vehicle body. This output section 7 outputs the control signals, which are input from the drive assist control section 6, to the ECU and the like of the vehicle body. In this way, the vehicle body can execute the above-described vehicle body control and issue the above-described warnings through the control of the ECU and the like.

A description will hereinafter be made on an overview of rotation correction processing of the image data by the image-recognition device 10.

FIG. 2 is a view that schematically depicts a tilted state of the vehicle body from front of the vehicle body, FIG. 3 is an image ahead of the vehicle body that is captured from the vehicle body side, and FIG. 4 is an image that is obtained by rotating the captured image for the correction. Note that FIG. 3 and FIG. 4 depict a state where a vehicle c as an automobile runs ahead of the vehicle body on a road surface r of a right-hand curve that is provided on horizontal ground g.

When turning a curve, the driver tilts the vehicle body so as to resist against a centrifugal force, and the motorcycle thus runs. As depicted in FIG. 2, when turning to the right, for example, the vehicle body is tilted to a right side. Note that FIG. 2 depicts a state where the vehicle body is tilted at a tilt angle $\alpha$ with respect to a virtual line O that extends in a gravitational direction. When the vehicle body is tilted to the right at the tilt angle $\alpha$, the imaging section 3 that is mounted in and fixed to the vehicle body is tilted with the vehicle body. Thus, as depicted in FIG. 3, the image captured by the imaging section 3 becomes an image that is tilted counterclockwise at the tilt angle $\alpha$.

Initially, when the tilt angle sensor 1 detects the tilt angle $\alpha$ of the vehicle body, the tilt angle sensor 1 outputs the tilt angle signal to the tilt angle input section 2. In this way, the tilt angle input section 2 detects the tilt angle $\alpha$ of the vehicle body and outputs the tilt angle data as the tilt information to the imaging section 3.

Then, when the tilt angle data from the tilt angle input section 2 is input, the imaging section 3 outputs the image data, which corresponds to the captured image, with the tilt angle data to the image-rotation section 4.

When the tilt angle data and the image data are input from the imaging section 3, the image-rotation section 4 rotates the image data for the correction on the basis of the tilt angle data and generates the corrected image data. At this time, in the rotation correction of the image data, the image that corresponds to the image data is corrected, so as to be tilted in a tilt direction of the vehicle body by an amount of the tilt of the vehicle body. More specifically, as depicted in FIG. 4, the image that corresponds to the corrected image data corrected by the rotation correction is rotated clockwise by the angle $\alpha$. Thus, the road surface r, the ground g, and the vehicle c that runs ahead in the image are displayed such that the vehicle body runs horizontally to the road surface r. The image-rotation section 4 outputs the corrected image data, which is generated, to the image-recognition section 5.

When the corrected image data is input, the image-recognition section 5 performs image-recognition processing on the basis of the corrected image data so as to recognize the surrounding situation of the vehicle body, and outputs the position information data, which includes the position information of each of the recognized objects and the like, to the drive assist control section 6. Note that the position information data is data in which the image data, which has been rotated for the correction, is coupled to the position information of each of the recognized objects and the like. For example, the image that corresponds to the position information data may display the position information of each of the recognized objects and the like on the image.

When the position information data is input, the drive assist control section 6 executes the vehicle body control and the processing related to the warning and outputs the control signal to the output section 7.

When the control signal is input, the output section 7 outputs the received control signal to each device of the vehicle body, such as the ECU.

After rotating the image data, which corresponds to the image captured in the tilted state of the vehicle body, for the correction by the above processing, the image-recognition device 10 performs the image-recognition processing.

In this embodiment, the image-recognition device 10 includes: the image-rotation section 4 that rotates the image data for the correction in accordance with the tilt angle α detected by the tilt input section 2; and the image-recognition section 5 that recognizes the surrounding situation of the vehicle body on the basis of the corrected image data that is generated when the image-rotation section 4 rotates the image data for the correction. Accordingly, the image-recognition section can perform the image-recognition processing by using the same algorithm as that at a time when the vehicle body is not tilted. Thus, even when the vehicle body is tilted, the image recognition can appropriately be performed.

FIG. 5 is a block diagram of an image-recognition device 20 according to a second embodiment. FIG. 6 is a view that schematically depicts a tilted state of the vehicle body on a tilted road surface from the front of the vehicle body. Note that the image-recognition device 20 according to the second embodiment differs from the first embodiment in terms of a configuration that includes a tilt angle estimation section (a tilt-detection section) 8 instead of the tilt angle sensor 1 and the tilt angle input section 2 in the first embodiment. Note that, in FIG. 5, a substantially similar configuration to that of the first embodiment will be denoted by the same reference signs, the overlapping description will not be made, and different portions will be described in detail.

The image-recognition device 20 according to this embodiment includes the tilt angle estimation section 8. This tilt angle estimation section 8 analyzes the image data that corresponds to the image captured by the imaging section 3, and detects a tilt angle γ of the vehicle body with respect to a virtual line O' that is perpendicular to the road surface r. That is, the tilt angle α of the vehicle body with respect to the virtual line O in the gravitational direction does not have to be detected by the tilt angle sensor or the like. At this time, the tilt angle estimation section 8, for example, uses an optical flow to represent motion of the object in the image by a vector and thereby estimates the tilt angle γ of the vehicle body. In this way, as depicted in FIG. 6, even when the road surface r is tilted at a tilt angle β, the tilt angle γ of the vehicle body is detected with the road surface r being a reference. Thus, the tilt angle γ of the vehicle body with respect to the virtual line O' that is perpendicular to the road surface r is detected. Accordingly, even when the vehicle body currently runs on the tilted road surface r, the image-recognition device 20 displays the road surface r and the ground g horizontally, as depicted in FIG. 4, in the image corresponding to the corrected image data that is rotated for the correction so as to eliminate the tilt angle γ of the vehicle body.

When detecting the tilt angle γ of the vehicle body on the basis of the image captured by the imaging section 3, the tilt angle estimation section 8 generates the tilt angle data and outputs the generated tilt angle data to the image-rotation section 4. That is, in the second embodiment, the tilt angle data is directly output to the image-rotation section 4 without interposing the imaging section 3, and only the image data is output from the imaging section 3 to the image-rotation section 4.

In this embodiment, the image-recognition device 20 includes the tilt angle estimation section 8 and detects the tilt angle γ of the vehicle body with respect to the virtual line O', which is perpendicular to the road surface r, on the basis of the image captured by the imaging section 3. In this way, the tilt angle α that has the gravitational direction as the reference does not have to be detected by the tilt angle sensor or the like. The image corresponding to the corrected image data, which has been rotated for the correction, can always display the road surface r horizontally even when the road surface r is tilted. Thus, even when the vehicle body or the road surface r is tilted, the image recognition can appropriately be performed.

The invention has been described so far on the basis of the embodiments. However, the invention is not limited thereto. For example, in the first embodiment, the rotation correction of the image data, which corresponds to the image, is performed only by using the tilt angle α detected by the tilt angle sensor 1. However, the invention is not limited thereto. In addition to the tilt angle sensor, a pitch rate sensor or the like is connected to the image-recognition device, and vehicle body behavior information such as a pitch rate is used. In this way, the rotation correction of the image data may be performed at even higher accuracy. The vehicle body behavior information may be obtained by using a sensor other than the camera, such as a radar or an ultrasonic wave sensor.

In the above embodiments, the tilt of the vehicle body is detected by the tilt angle. However, the invention is not limited thereto. As long as the tilt of the vehicle body can be detected, the tilt of the vehicle body may be detected on the basis of an element other than the angle.

Furthermore, in the above embodiments, the image-recognition device 10 or 20 is mounted in the motorcycle. However, the invention is not limited thereto. As long as the image-recognition device can be mounted in the vehicle, the vehicle may be an automobile or another type of the vehicle.

The invention claimed is:

1. An image-recognition device that is mounted in a vehicle body and that recognizes a surrounding situation of the vehicle body on the basis of image data that corresponds to an image of surroundings captured from the vehicle body, the image-recognition device comprising:
   a tilt-detection section that detects a tilt angle of the vehicle body with respect to a virtual line perpendicular to a road surface by representing motion of an objects in the image data as a vector;
   an image-rotation section that rotates the image data for correction in accordance with the tilt detected by the tilt-detection section such that the image is tilted only by an amount of the tilt in a direction of the tilt of the vehicle body; and
   an image-recognition section that recognizes the surrounding situation of the vehicle body on the basis of corrected image data that is generated when the image-rotation section rotates the image data for the correction, and that outputs position information data, which includes position information of recognized objections in the surrounding situation, to a drive assist control section executing a control for assisting a driver.

2. The image-recognition device according to claim 1, wherein the tilt-detection section further detects the tilt of the vehicle body by using a tilt angle sensor.

3. The image-recognition device according to claim 1, wherein
the tilt-detection section outputs tilt information that corresponds to the tilt to the image-rotation section.

4. A method for controlling an image-recognition device that is mounted in a vehicle body and that recognizes a surrounding situation of the vehicle body on the basis of image data that corresponds to an image of surroundings captured from the vehicle body, the image-recognition device including:
a tilt-detection section that detects a tilt angle of the vehicle body with respect to a virtual line perpendicular to a road surface by representing motion of an objects in the image data as a vector;
an image-rotation section that rotates the image data for correction in accordance with the tilt detected by the tilt-detection section; and
an image-recognition section that recognizes a surrounding situation of the vehicle body on the basis of corrected image data that is generated when the image-rotation section rotates the image data for the correction, the method comprising:
detecting the tilt of the vehicle body by the tilt-detection section;
rotating the image data for the correction by the image-rotation section in accordance with the tilt detected by the tilt-detection section such that the image is tilted only by an amount of the tilt in a direction of the tilt of the vehicle body;
recognizing the surrounding situation of the vehicle body by the image-recognition section on the basis of the corrected image data that is generated when the image-rotation section rotates the image data for the correction;
generating position information data, the position information data including position information of recognized objects in the surrounding situation; and
outputting the position information data to a drive assist control section executing a control for assisting a driver.

5. The method for controlling the image-recognition device according to claim 4, wherein
the tilt-detection section further detects the tilt of the vehicle body by using a tilt angle sensor.

6. The method for controlling the image-recognition device according to claim 4, wherein
the tilt-detection section outputs tilt information that corresponds to the tilt to the image-rotation section.

* * * * *